June 24, 1952
F. W. ZILINSKY
2,601,487
INSECT RETRIEVER
Filed Jan. 23, 1950
3 Sheets-Sheet 1
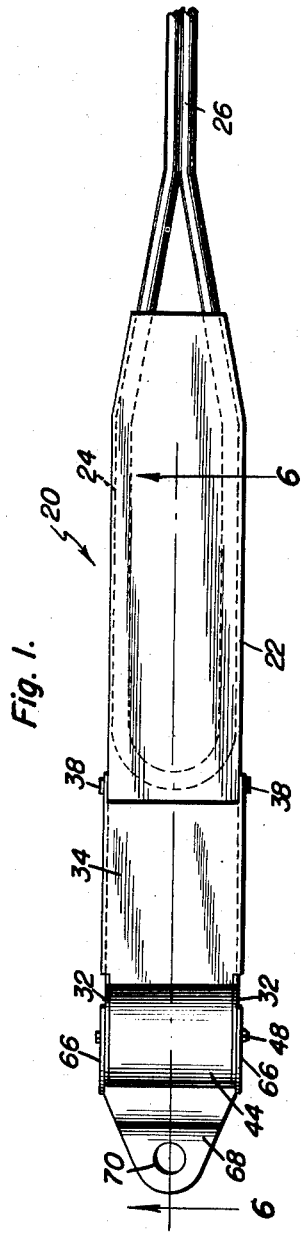
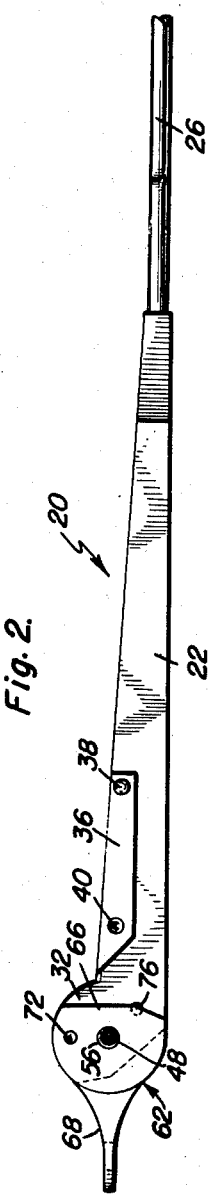
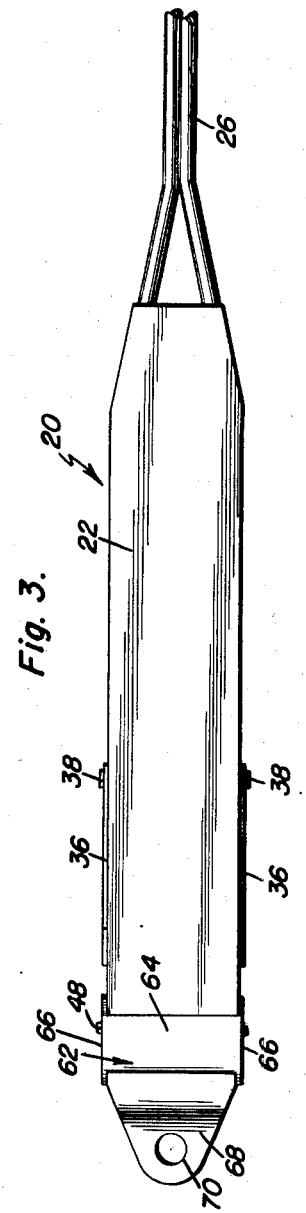
Inventor
Frank W. Zilinsky
By Clarence A. O'Brien
and Harvey B. Jacobson
Attorneys

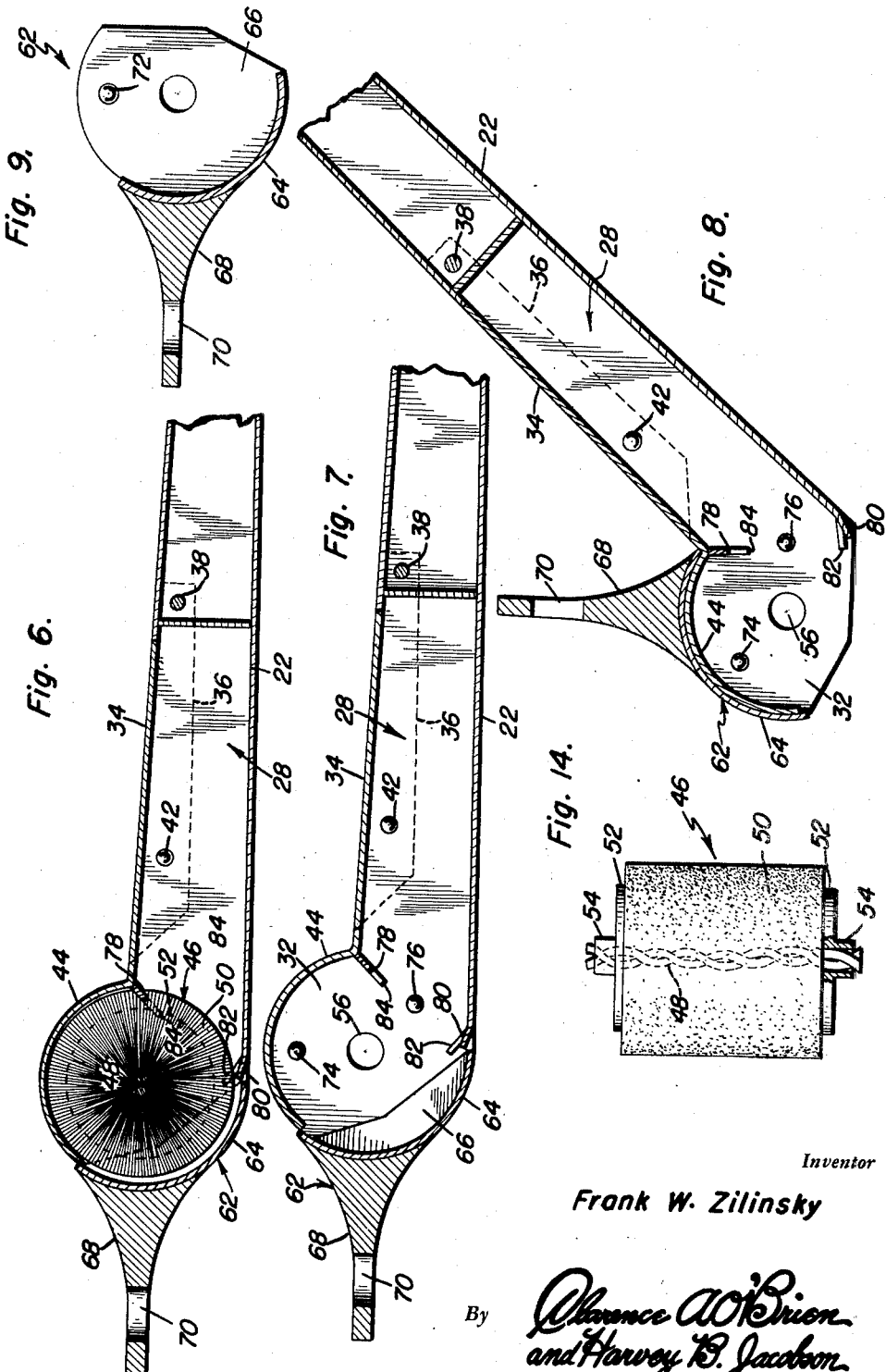

June 24, 1952　　　F. W. ZILINSKY　　　2,601,487
INSECT RETRIEVER
Filed Jan. 23, 1950　　　　　　　　　　3 Sheets-Sheet 3
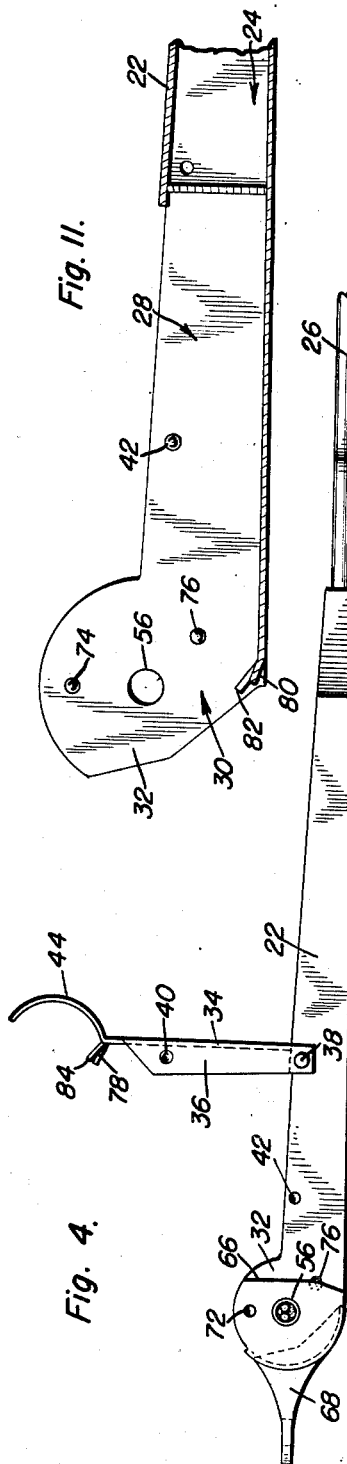
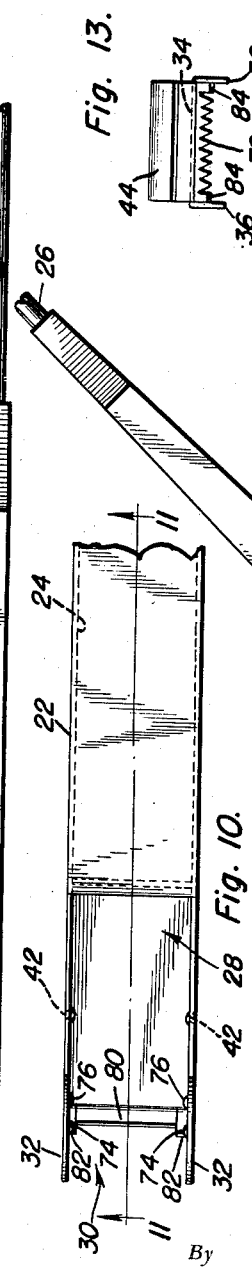
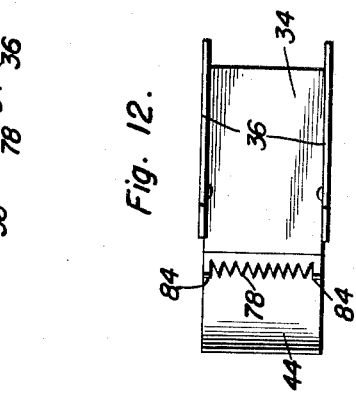
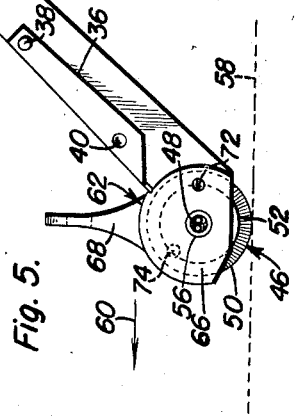
Inventor
Frank W. Zilinsky
By *Clarence A. O'Brien
and Harvey B. Jacobson*
Attorneys Patented June 24, 1952

2,601,487

UNITED STATES PATENT OFFICE 2,601,487

INSECT RETRIEVER

Frank W. Zilinsky, Downey, Calif.

Application January 23, 1950, Serial No. 140,085

6 Claims. (Cl. 43—137)

This invention relates to new and useful improvements and structural refinements in insect retrievers, and the principal object of the invention is to facilitate convenient, expeditious and sanitary gathering of flies after they are killed by a fly swatter, although it is to be understood that the invention may also be employed for gathering other insects and similar articles.

The above object is achieved by the provision of the instant retriever which embodies in its construction an elongated housing affording a receptacle and equipped with a rotatable brush which is adapted to engage insects and propel or deliver them into the receptacle, from which they may be subsequently emptied.

An important feature of the invention resides in the structural arrangement of the insect engaging and delivering brush per se, while other features lie in the provision of means in the aforementioned receptacle for cleaning the brush of insects.

Additional features involve the provision of a closure on the body of the retriever, which closure is swingable under the brush so as to close the associated receptacle when the invention is not in use.

Some of the advantages of the invention lie in its simplicity of construction, in its expeditious and highly sanitary operation, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is a top plan view of the invention in its closed position;

Figure 2 is a side elevational view thereof;

Figure 3 is an underside plan view of the same;

Figure 4 is a side elevational view, similar to that shown in Figure 2, but illustrating the door of the receptacle in its open position;

Figure 5 is a side elevational view of the invention in use, the closure thereof being open but the door thereof being closed;

Figure 6 is a fragmentary longitudinal sectional view, taken substantially in the plane of the line 6—6 in Figure 1;

Figure 7 is a longitudinal sectional view, similar to that shown in Figure 6, but with the brush removed;

Figure 8 is a sectional view, similar to that shown in Figure 7 but with the housing and closure in an operative position;

Figure 9 is a longitudinal sectional view of the closure per se;

Figure 10 is a fragmentary top plan view of the housing with the door, closure and brush removed;

Figure 11 is a sectional view, taken substantially in the plane of the line 11—11 in Figure 10;

Figure 12 is an underside plan view of the door;

Figure 13 is an end view of the door, and

Figure 14 is a top plan view of the brush per se, this being partly broken away so as to reveal its construction.

Like characters of reference are employed to designate like parts in the specification and throughout the several views.

Referring now to the accompanying drawings in detail, the invention consists of an insect retriever designated generally by the reference character 20, the same embodying in its construction an elongated body or housing 22, one end portion of which is provided with a socket 24 for the reception of one end portion of a suitable handle 26, preferably the handle of a conventional fly swatter, so that the invention is instantly available for use after a fly has been swatted. The end portion of the handle 26 is secured in the socket 24 in any suitable manner.

The remaining portion of the housing 22 affords what may be referred to as a receptacle 28 having an open end portion 30 defined by substantially semicircular extensions or ears 32 with which the housing is equipped.

An upwardly swingable door 34 is provided for the receptacle 28 at the top of the housing, this door having lateral flanges 36 which are pivoted as at 38 to the housing and are provided with opposing, inwardly projecting detents 40 receivable in complemental depressions 42 with which the housing is equipped, so as to releasably retain the door 34 in its closed position.

It is to be noted that the door 34 is provided with an arcuate end portion or extension 44 which abuts upper edges of the ears 32 when the door is closed.

An insect engaging and delivering brush unit designated generally by the reference character 46 is rotatably mounted in the open end portion 30 of the receptacle 28, that is, between the ears 32, this brush unit consisting of a "shaft" 48 composed of a plurality of wires or rods which are twisted together and have secured therebetween inner end portions of a roll of resilient, radially projecting bristles 50.

A pair of travelling wheels 52 are provided on the shaft 48 at the opposite ends of the row of bristles, these wheels having tubular "hubs" 54 wherein the end portions of the shaft 48 are rigidly secured. The hubs 54, in turn, are rotatably mounted in axially aligned bearings or apertures 56 provided in the ears 32, whereby rotation of the entire brush unit 46 is facilitated. It is to be noted at this point that the bristles 50 extend substantially beyond the periphery of the traveling wheels 52, but by simply pressing the entire device against a surface (indicated at 58 in Figure 5) the resilient bristles may be bent so that the traveling wheels 52 may engage the surface and impart rotation to the brush unit when the device is moved or pushed as indicated by the arrow 60.

A closure member designated generally by the reference character 62 is provided for the open end portion 30 of the receptacle 28, the closure member 62 simply assuming the form of an arcuate wall 64 provided with a pair of spaced ears 66 which "straddle" the aforementioned ears 32 and are rotatable on the hubs 54 independently of the rotation of the brush unit, this being so arranged that when the member 62 is in its closed position, it extends under the brush unit and closes the open end portion 30 of the chamber 28. On the other hand, the closure member 62 may be swung upwardly to an open position wherein the wall 64 thereof is disposed above the extension or portion 44 of the door 34 while the lower end portion of the brush unit 46 projects downwardly, as is best illustrated in Figure 5.

A finger piece 68 is provided on the wall 64 of the closure member 62 and is formed with an aperture 70 so that it may also function as a suspension element for hanging the entire device on a nail or hook in a wall, when it is not in use. It is to be noted that when used as a suspension element, the member 68 is in substantial longitudinal alignment with the body 22 and handle 26, thus permitting the handle 26 to hang downwardly while the member 62 closes the open end portion of the receptacle in the housing.

Means are provided for releasably retaining the member 62 either in its closed or in its open position, these means consisting of inwardly struck detents 72 on the ears 66, which detents are selectively receivable in complemental depressions 74, 76 in the ears 32, the engagement of the detents 72 with the depressions 74 maintaining the closure in its closed position, while engagement of such detents with the depressions 76 retaining the closure open.

A tooth brush cleaning member 78 is secured to the inner surface of the aforementioned door 34 and, when the door is closed, is disposed in the receptacle 28 to engage the bristles 50 of the brush unit 46, while an angularly disposed ledge 80 is provided on the bottom wall of the receptacle 28 between the ears 32 and merely touches the bristles of the brush unit. Moreover, a pair of angularly disposed fingers 82 are provided at the opposite ends of the ledge 80 and extend into spaces existing between the ends of the roll of bristles and the ears 32, as necessitated by the provision of the wheels 52.

When the invention is placed in use for retrieving insects such as a fly, or the like, the closure member 62 is simply swung to its open position so as to expose the brush unit 46, whereand the wheels 52 engage with the surface 58, from which the insect is to be retrieved. During this rolling action a downward pressure is applied to the device so that the bristles are bent and the wheels 52 engage with the surface 58, thus imparting rotation to the brush unit. When the brush unit travels over an insect, the latter is engaged by the resilient, bent bristles, and as rotation of the brush unit continues the insect engaging bristles will eventually come out of contact with the surface 58, and by virtue of their inherent resiliency, will forcibly propel or discharge the insect engaged into the receptacle 28. It is to be observed that this propelling or discharging action will take place notwithstanding the provision of the ledge 80, the purpose of the latter as well as of the fingers 82 being to prevent any possibility of insects dropping outwardly from the receptacle through its open end portion in which the brush is located. For the same purpose, additional fingers 84 may project from the end portions of the cleaning member 78 into the spaces between the ends of the roll of bristles and the ears 32, as do the fingers 82.

In the event an insect or other foreign matter is impaled on the bristles, the brush cleaning member 78 will effectively remove the same while the brush unit is in rotation and such an insect or foreign matter will simply be deposited in the receptacle 28.

As is best illustrated in Figure 5, when the closure member 62 is open, the finger piece 68 thereof is substantially perpendicular to the surface 58, thus indicating to the operator that the handle 26 and the housing 22 are being held in proper angular relation to the surface 58 to assure correct operation of the brush unit and to provide proper clearances between the surface 58 and the adjacent edges of the ears 32, 66.

Insects and other foreign matter accumulated in the receptacle 28 may be readily discharged by simply swinging the member 62 to its closed position and opening the door 34.

It is believed that the advantages and use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In an insect retriever, the combination with a fly swatter having a handle of an elongated housing affording a receptacle having a forward attaching portion for receiving said handle, a rear open end portion, a partition disposed between said attaching portion and said open end portion, a rotatable brush mounted in said rear open end portion of said housing and having resilient bristles for engaging and delivering an insect into said receptacle, a brush cleaning member provided in the receptacle and engaging said bristles, and a pivoted closure provided for the open end portion of said housing, said closure being adapted to swing under said brush member.

2. The device as defined in claim 1 together with a discharge door provided on said housing for said receptacle.

3. The device as defined in claim 1 together with a discharge door provided on said housing for said receptacle, said brush cleaning member being mounted contiguous to the inner surface of said door and being disposed exteriorly of the receptacle when the door is opened.

4. The device as defined in claim 1 together with an elongated handle provided on said housing, and a suspension element projecting outwardly from said closure, said element being in substantial longitudinal alignment with said housing and said handle when the closure is in its closed position.

5. The device as defined in claim 1 together with means independent of said closure for preventing discharge of insects through the open end portion of said receptacle.

6. An insect retriever comprising an elongated housing affording a receptacle having a forward attaching portion for receiving a handle, a rear open end portion, a partition disposed between said attaching portion and said open end portion, a rotatable brush mounted in said rear open end portion of said housing and having resilient bristles for engaging and delivering an insect into said receptacle, a brush cleaning member provided in the receptacle and engaging said bristles, and a pivoted closure provided for the open end portion of said housing, said closure being adapted to swing under said brush member.

FRANK W. ZILINSKY.

REFERENCES CITED

The following references are of record in the file of this patent:

UNITED STATES PATENTS

| Number | Name | Date |
| --- | --- | --- |
| 126,945 | Finn | May 21, 1872 |
| 538,297 | Terry | Apr. 30, 1895 |
| 541,495 | Paris | June 25, 1895 |
| 894,011 | Kampfe | July 21, 1908 |
| 1,326,577 | Cullen | Dec. 30, 1919 |
| 1,393,571 | Riek | Oct. 11, 1921 |
| 1,559,105 | Johnson | Oct. 27, 1925 |
| 2,026,414 | Burch | Dec. 31, 1935 |
| 2,218,166 | Gerber | Oct. 15, 1940 |
| 2,237,830 | Jerome | Apr. 8, 1941 |

FOREIGN PATENTS

| Number | Country | Date |
| --- | --- | --- |
| 429,773 | Great Britain | June 16, 1935 |